US011858626B2

(12) United States Patent
Saikin

(10) Patent No.: US 11,858,626 B2
(45) Date of Patent: Jan. 2, 2024

(54) AUTONOMOUS AIR VEHICLE DELIVERY SYSTEM INCORPORATING DEPLOYMENT

(71) Applicant: Diego Alejandro Saikin, Tel Aviv (IL)

(72) Inventor: Diego Alejandro Saikin, Tel Aviv (IL)

(*) Notice: Subject to any disclaimer, the term of this patent is extended or adjusted under 35 U.S.C. 154(b) by 302 days.

(21) Appl. No.: 17/302,512

(22) Filed: May 5, 2021

(65) Prior Publication Data

US 2022/0371729 A1 Nov. 24, 2022

(51) Int. Cl.
| | | |
|---|---|---|
| *B64C 39/02* | (2023.01) | |
| *G05D 1/10* | (2006.01) | |
| *G05D 1/12* | (2006.01) | |
| *B64D 1/02* | (2006.01) | |
| *B64U 10/13* | (2023.01) | |
| *B64U 101/60* | (2023.01) | |

(52) U.S. Cl.
CPC ............. *B64C 39/024* (2013.01); *B64D 1/02* (2013.01); *G05D 1/101* (2013.01); *G05D 1/12* (2013.01); *B64U 10/13* (2023.01); *B64U 2101/60* (2023.01)

(58) Field of Classification Search
CPC ............. B64C 39/024; B64U 2101/60; B64U 2101/64; B64U 2101/67; B64U 10/13; G05D 1/101; G05D 1/12; B64D 1/02
See application file for complete search history.

(56) References Cited

U.S. PATENT DOCUMENTS

| | | | | |
|---|---|---|---|---|
| 9,688,404 | B1* | 6/2017 | Buchmueller | B64D 1/12 |
| 2019/0100314 | A1* | 4/2019 | Prager | B66D 1/60 |
| 2019/0263522 | A1* | 8/2019 | Simon | G06Q 10/0832 |
| 2020/0207474 | A1* | 7/2020 | Foggia | G05D 1/0676 |

FOREIGN PATENT DOCUMENTS

WO PCT/EP2020/0234427 * 11/2020 ............... B64D 1/22

OTHER PUBLICATIONS

Diego A. Saikin et al., "Wildfire Fighting by Unmanned Aerial System Exploiting its Time-Varying Mass", IEEE scientific journal, https://ieeexplore.ieee.org/document/8989795, IEEE Robotics and Automation Letters, vol. 5 Issue: 2, Feb. 10, 2020.

Diego A. Saikin, "Predictive Control of an Unmanned Aerial Vehicle with a Time-Variable Mass Author statement for master thesis", Research Gate, https://www.researchgate.net/publication/329372293_Predictive_Control_of_an_Unmanned_Aerial_Vehicle_with_a_Time-Variable_Mass_Author_statement_for_master_thesis, Dec. 2018.

* cited by examiner

*Primary Examiner* — Marc Burgess
*Assistant Examiner* — John D Holman
(74) *Attorney, Agent, or Firm* — Zaretsky Group PC; Howard Zaretsky

(57) ABSTRACT

A novel and useful system and method of air delivery of payloads incorporating a zero or near zero velocity deployment maneuver that enables aircraft to smoothly deploy payloads without dropping them and without requiring the aircraft to land. A multicopter fitted with the mechanism lowers the payload to smoothly touchdown in a matter of seconds without the need to hover above the destination. In operation, the payload hangs from a tether, pendulum, or robotic arm and is extended prior to arrival to the target destination. The hanging payload begins swinging in a controlled and coordinated manner with the trajectory of the autonomous air vehicle such that the payload arrives at the delivery point at zero or near zero velocity relative to it, while the vehicle maintains its forward movement. The payload is released from the tether at the exact moment the payload touches or is about to touch the ground.

20 Claims, 4 Drawing Sheets

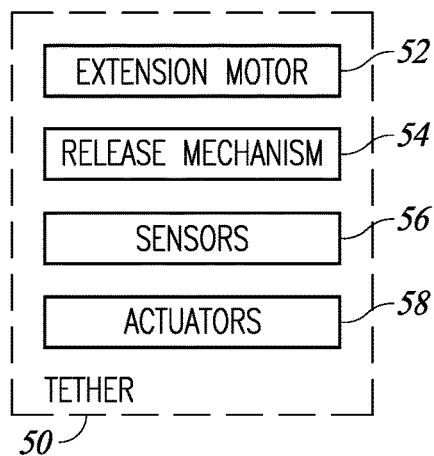
FIG. 3
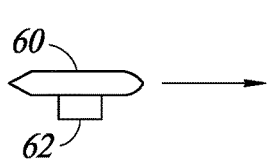
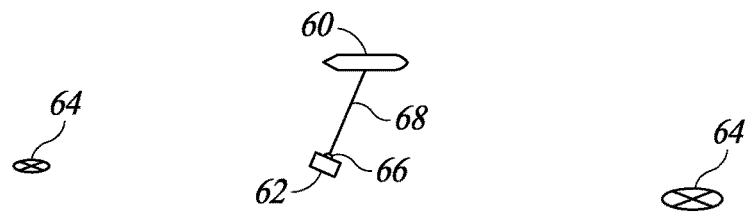
FIG. 4A
FIG. 4B
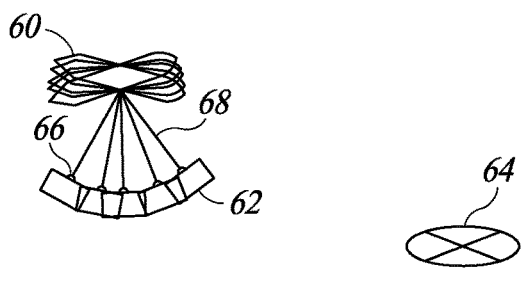
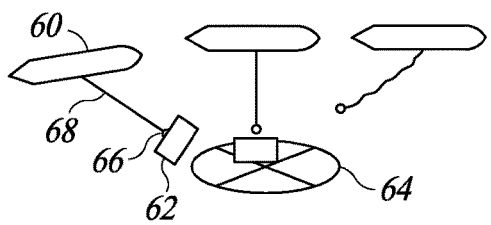
FIG. 4C
FIG. 4D

AUTONOMOUS AIR VEHICLE DELIVERY SYSTEM INCORPORATING DEPLOYMENT

FIELD OF THE DISCLOSURE

The subject matter disclosed herein relates to the field autonomous air vehicles and more particularly relates to a system and method of air delivery of payloads incorporating a zero or near zero velocity maneuver for fast and smooth deployment of payloads.

BACKGROUND OF THE INVENTION

In recent years there has been growing interest by e-commerce companies in delivering packages using autonomous solutions. Such a solution is a delivery drone which is an unmanned aerial vehicle (UAV) or autonomous air vehicle (AAV) used to transport packages, medical supplies, food, or other goods. E-commerce companies would like to use drones to drop off retail packages at consumers' doorsteps. Delivery by AAV is likely to benefit consumers by making the last mile delivery from local warehouses to the customer's location less expensive and more cost efficient.

One advantage drones have is that they can travel over congested areas and can travel from one location to location another along a straight path and not be constricted to rigid paths like ground vehicles are restricted to existing roads. In addition, drones can reach rural areas, far off rural areas where cars and trucks may have difficulty reaching.

Currently, aircraft or air vehicle delivering cargo have several choices for deploying their payloads. First, the aircraft can land on the desired location and unload the payload on the ground. This method, however, requires time and if the drone is a fixed-wing aircraft, also a landing strip. This method therefore requires the air vehicle to land.

Second, the aircraft can lower the payload using a crane-like tether mechanism. This method requires the drone to hover above the destination. Besides the mere ability to hover, hovering consumes a large amount of power which limits the operating range of the drone. This method is only suitable for rotary wing aircraft such as drones or helicopters, or lighter than air airships because it requires the vehicle to hover above the deployment location which consumes large amounts of energy and time. In the case of hybrid aircraft that use both fixed and rotary wing methods to remain airborne, e.g., multiple electric vertical take off and landing (eVTOLs) currently in use by drone based delivery companies, the need to transition to rotary wing mode drastically increases energy consumption and consequently reduces the time and thus the range these systems can reach. Flying only in fixed-wing mode, however, does increase the payload capacity.

Third, the aircraft can drop the payload with a cushion mechanism to dampen the impact, protective shell, parachute, paraglider or a whirling mechanism that mimics the maple seed to utilize air drag to lower the freefall speed. This method, however, besides not being very precise, requires special equipment to be added to the payload itself, thereby increasing costs. In addition, this third method provides neither a smooth touchdown nor a precise deployment and has the disadvantage of requiring additional equipment be added to the payload.

In addition to the three methods mentioned above, as a rule of thumb, fixed wing aircraft can carry heavier payloads than rotary wing aircraft for a given amount of power.

There is thus a need for an autonomous air vehicle (AAV) based delivery system that is capable of delivering packages quickly, inexpensively, that does not require landing strips, does not consume large amounts of energy, does not require special equipment to be added to the package to be delivered, and does not require the need to hover above the delivery location, land on it or deploy the payload with a parachute or cushion mechanism.

SUMMARY OF THE INVENTION

The present invention is an autonomous air vehicle (AAV) payload delivery mechanism that enables smooth, accurate, and fast deployment of payloads from aircrafts (fixed wing or non-fixed wing such as lighter-than-air, rotary, hybrids, etc.) at a desired target destination without the need to cease moving forward at any time. The autonomous air vehicle based delivery system is capable of delivering packages quickly, inexpensively, without requiring (1) landing strips, (2) consuming large amounts of energy, (3) special equipment to be added to the payload to be delivered, (4) the need to hover above or land on the delivery location, and (5) delivering or deploying the payload with a parachute.

The mechanism of the present invention drastically reduces the time needed for payload deployment, ensures the payload touchdown is smooth, and allows winged aircraft to perform deployments that only rotary wing aircraft or hybrid winged VTOL without fully transitioning to hover mode were able to perform.

The aircraft executes a deployment maneuver that enables it to smoothly deploy payloads without dropping them and without requiring the aircraft to land. A multicopter fitted with the mechanism lowers the payload to smoothly touchdown in a matter of seconds without the need to hover above the destination. In operation, the payload hangs from a tether and is extended prior to arrival to the target destination. The hanging payload begins swinging in a controlled and coordinated manner with the trajectory of the autonomous air vehicle such that the payload arrives at the delivery point at zero or near zero velocity relative to it, while the vehicle maintains its forward movement. The payload is released from the tether at the exact moment the payload touches or is about to touch the ground.

There is thus provided in accordance with the invention, a method of delivering a payload for use in an autonomous air vehicle (AAV), the method comprising flying said AAV loaded with at least one payload towards a target destination, initiating performance of a deployment maneuver at some point before said AAV arrives at said target destination, as a result of said deployment maneuver touching down said payload at or near said target destination, and releasing said payload held by a tether at a point in its trajectory where relative velocity of said payload with respect to said target destination is at or near zero as a result of said deployment maneuver.

There is also provided in accordance with the invention, an apparatus for delivering a payload for use in an autonomous air vehicle (AAV), comprising an onboard flight computer operative to receive data from a plurality of onboard sensors and control flying of said AAV loaded with at least one payload towards a target destination, an optimizer operative to generate said deployment maneuver whereby the at least one payload touches down at or near said target destination and is released at a point in its trajectory where relative velocity of said at least one payload is at or near zero with respect to said target destination, and a scheduler operative to control said deployment maneuver procedure including initiating execution thereof at some point before said AAV arrives at said target destination.

There is further provided in accordance with the invention, a method of delivering a payload for use in an autonomous air vehicle (AAV), the method comprising flying said AAV loaded with at least one payload towards a target destination, initiating performance of a deployment maneuver at some point before said AAV arrives at said target destination whereby said at least one payload swings in a pendulum-like manner, maneuvering said AAV such that a trajectory of said at least one payload has a relative speed of zero or near zero velocity with respect to said target destination and a height above said target destination of zero or near zero at which said at least one payload held by a tether is released, and wherein said AAV is not required to cease moving forward during performance of said deployment maneuver.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 3 is a high level block diagram illustrating the components of an example tether portion of an AAV;

FIG. 4A is a diagram illustrating an example AAV dispatched carrying a payload;

FIG. 4B is a diagram illustrating an example AAV with its tether extended before arriving at the destination;

FIG. 4C is a diagram illustrating an example AAV making a series of accelerations and decelerations before arriving at the destination in order to induce oscillations on the tether;

FIG. 4D is a diagram illustrating an example AAV just before and after payload delivery whereby the payload has zero ground speed;

DETAILED DESCRIPTION

Figure 1:
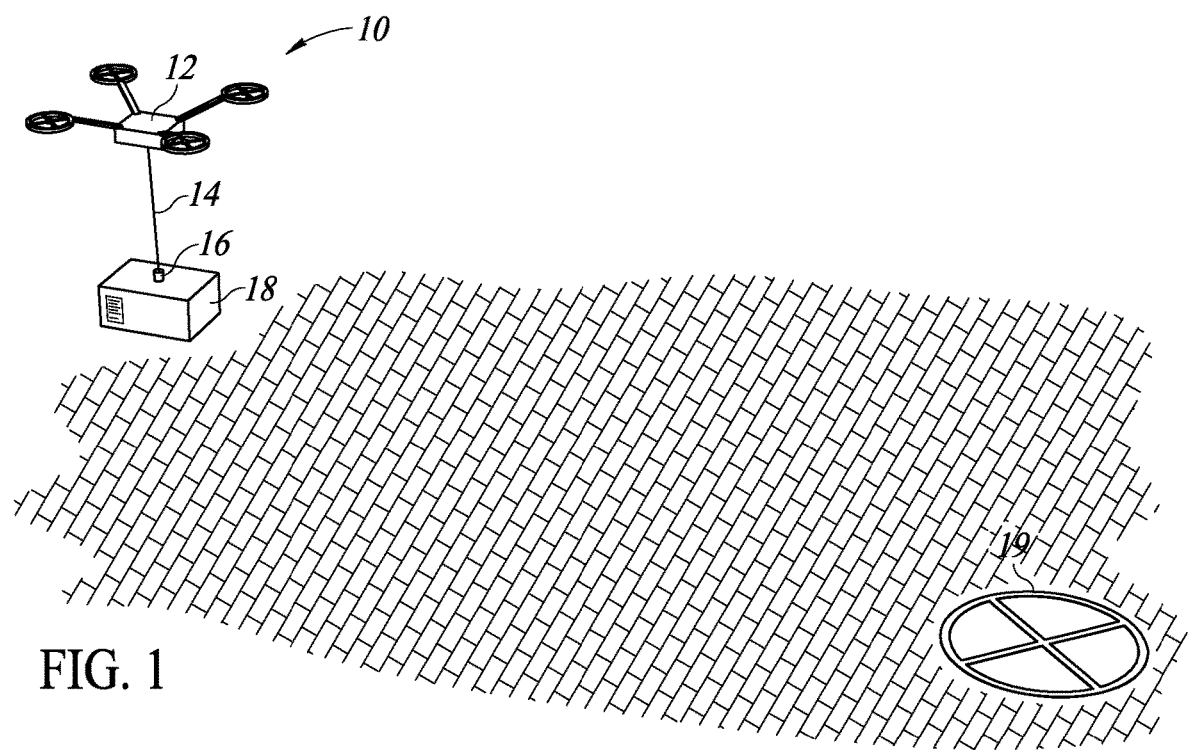
FIG. 1 is a diagram illustrating an example autonomous air vehicle (AAV) package or payload package delivery system enroute to a target destination.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein. It is to be understood, however, that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

A diagram illustrating an example autonomous air vehicle (AAV) package or payload package delivery system enroute to a target destination is shown in FIG. 1. The components of the AAV system, generally referenced 10, comprises the AAV 12 having a tether 14 supporting a payload 18 (e.g., package, etc.) via an attachment and release mechanism 16. The AAV 12 may comprise any suitable fixed wing, non-fixed wing, or rotary wing aircraft such as a quadcopter or drone. The release mechanism 16 functions to release the payload 18 either by a signal generated by an onboard flight computer in the AAV or in accordance with one or more sensors coupled to the tether or the AAV.

The mechanism of the present invention obviates the need to hover above the delivery location (i.e. target destination) 19, land on it, deploy the payload with a parachute (or other protective mechanism such as a shell, cushion, etc.), or match the velocity with that of the target destination in the case of a vessel for example. The mechanism drastically reduces the time needed for payload deployment, ensures the payload touchdown is smooth, and allows winged aircraft to perform deployments that only rotary wing aircraft were able to perform.

The present invention provides a mechanism that enables fixed or nonfixed-wing aircraft to smoothly deploy payloads without dropping them and without requiring the aircraft to land. In one embodiment, an air vehicle such as a multicopter, hybrid UAV having both rotary and fixed wing lift, etc. fitted with the mechanism lowers the payload to smoothly touchdown in a matter of seconds without the need of a prolonged hover above the destination or landing on it. A hybrid fixed-wing rotary wing aircraft would not have to fully transition to hovering mode to deploy the payload. Air cargo deliveries are thus much more efficient.

In another embodiment, the payload hangs from a tether which may comprise a rope, cable, pendulum, or robotic arm that is extended prior to arrival to the target destination (i.e. delivery point or deployment location). The hanging payload is made to begin swinging in a controlled and coordinated manner with the trajectory of the autonomous air vehicle such that the payload arrives at the delivery point at zero or near zero velocity relative to it, while the vehicle maintains its forward movement. The payload is released from the tether at substantially the exact moment when the payload touches or is about to touch the ground (or comes 'close enough' to it). It is noted that the 'ground' may actually be a moving platform or a platform on water, e.g., vessel, etc.

Note that the term "tether" is used to refer to the deployment mechanism and is intended to include not only rope or cable but also any multiple link arrangement (actuated or not) such as a robotic arm although underactuated. The tether could have an arbitrary number of rigid, flexible, or elastic links, and each joint may or may not be actuated. Note that the actuation may be at the origin or middle via a joint actuator or may be propulsive (e.g., propeller/cold-gas thruster, etc.).

In addition, the tether may comprise an elastic material or formed by one or more links. The movement of the tether may comprise torsion, elongating or elliptical oscillations including swinging in any direction such as sideways.

Note further that the swinging may comprise a single swing that is not pendulum-like, where the physical behavior may not resemble a classic pendulum model, such as a circular or ellipsoidal motion. The payload is not necessarily dropped on the ground but could be dropped on water, a floating platform. The release point could be either static or moving (e.g., on a ship).

A key advantage of the mechanism of the present invention is that it makes it completely unnecessary for the aircraft to hover above the deployment location, to match the velocity, to land or to attach any air-drag device (e.g., parachute, etc.) to the payload. For hybrid fixed-wing, rotary-wing aircraft, the mechanism makes it unnecessary to transition to rotary wing mode. In addition, the mechanism does not require whatsoever the attachment of parachutes to the payload or any other modification to the payload. Another benefit is the resultant smooth touchdown provided by the deployment maneuver.

In addition, the mechanism allows for increased payload weight and range for a given amount of power or energy. The deployment of the payload is performed much quicker, in the event the space above or around the deployment location is hazardous.

Note that the invention is applicable to drone deliveries but may work as well for disaster relief, military and other applications in which quick and accurate payload deployment is necessary or desired.

Figure 2:
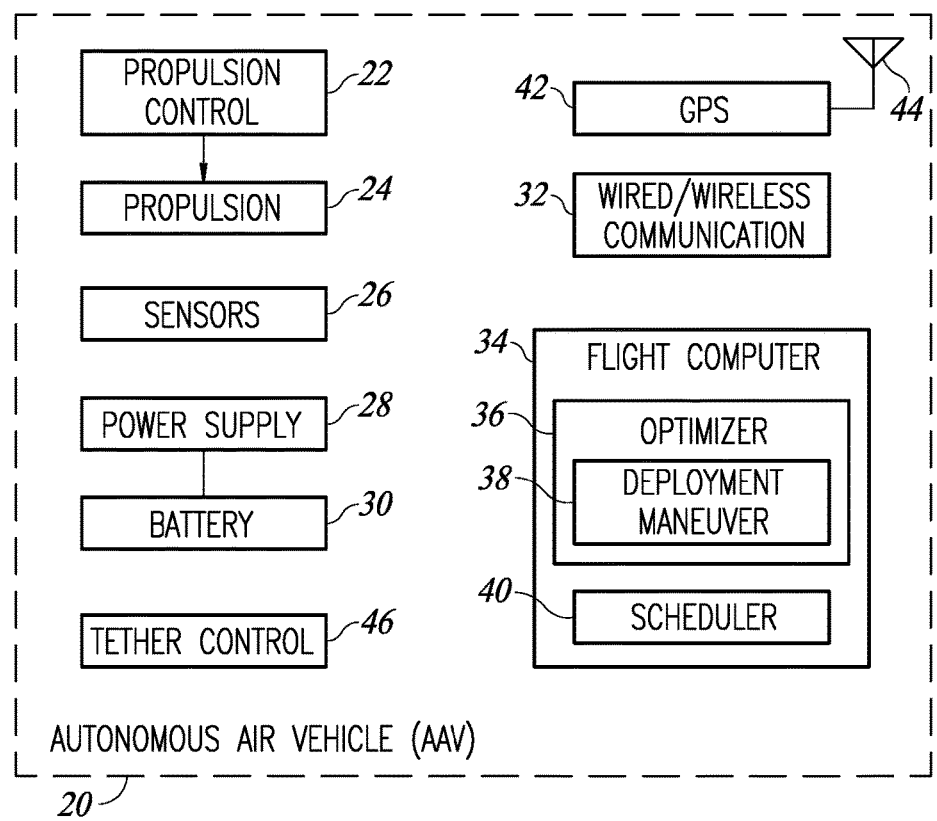
FIG. 2 is a high level block diagram illustrating the components of an example autonomous air vehicle (AAV)

A high level block diagram illustrating the components of an example autonomous air vehicle (AAV) is shown in FIG. 2. The autonomous air vehicle 20, comprises several components including an onboard flight computer 34, propulsion unit 24 (e.g., electric motors engines, etc.), propulsion control 22 (e.g., motor drive circuitry), a plurality of onboard sensors 26 (e.g., lidar, radar gyroscope, accelerometer, barometric pressure sensor, altimeter, cameras, etc.), power supply circuit 28 and battery 30, tether control unit 46, GPS receiver 42 and antenna 44, and wired/wireless communication unit 32 (e.g., USB, Ethernet, serial UART, Wi-Fi, RF links, etc. The onboard flight computer 34 comprises a scheduler 40 and optimizer 36 which executes the deployment maneuver 38.

In one embodiment, the AAV does not specifically require a Global Navigation Satellite System (GNSS) such as GPS 42. It does, however, require some kind of autonomous navigation mechanism whether GNSS or other system based.

Note also that in one embodiment, as described supra, the optimizer may comprise a neural network. In addition, the trajectory generation might be done on-board or remotely (i.e. off-board) and then uploaded to the AAV. Further, the AAV may be fully remotely controlled by an off-board computer during the maneuver. In the latter case, this may be accomplished utilizing 5G networks and an internet connection via satellite such as Starlink or oneWeb.

A high level block diagram illustrating the components of an example tether portion of an AAV is shown in FIG. 3. The tether 50 comprises several components including an extension motor 52, release mechanism 54, one or more sensors 56, and one or more actuators 58.

With reference to FIGS. 1, 2 and 3, the autonomous air vehicle (AAV) is operative to deliver the payload (i.e. cargo) to the target destination. Note that the autonomous air vehicle may also be referred to as unmanned aerial vehicle (UAV), unmanned air system (UAS), aircraft, or simply as drone. In practice, the autonomous air vehicle may comprise any type of aircraft having any size (e.g., rotary-wing, multicopter, fixed-wing, foldable wing, lighter-than-air, gyroplane, or any hybrid of the types enumerated supra). In addition, the autonomous air vehicle may be manned or unmanned, but the deployment maneuver is preferably autonomous as it is likely too challenging and complicated for a human pilot to perform.

In one embodiment, the tether 14 is an extendable-retractable link connecting the AAV 12 and the payload 18 that permits relative movement between them (namely, "pendulum" motion). Alternatively, the tether may comprise a mechanism that resembles a robotic arm as described in more detail infra.

The payload 18 is the object to be delivered to the target destination. The mechanism attempts to keep the modifications to a conventional cardboard box to a minimum. Some modifications, however, may be needed for aerodynamic purposes, for ease of releasing the payload or for propulsion/actuation of the tether. In addition, there may be more than one payload delivered per trip depending on the weight and dimensions of the different payloads, as well as the capabilities and characteristics of the AAV.

The release mechanism 16 is responsible for disengaging the tether and the payload. In on embodiment, the mechanism may comprise a loaded spring, electromagnet or pyrotechnical assembly, for example. Because this part is located at the end of the tether it may be fitted with sensors or actuators to ensure the smoothest and most reliable possible release.

The flight computer is an onboard computer responsible for the guidance navigation and control of the AAV. It typically also performs sensor acquisition and fusion and controls communication both wired and wireless. This computer generates the so called "deployment maneuver" trajectory described in more detail infra.

In one embodiment, the AAV is also equipped with various types of sensors including pose, velocity, and location estimation sensors examples of which include video cameras, event cameras, stereo cameras, depth cameras, lidars, ground proximity sensors, inertial measurement unit (IMU), Global Navigation Satellite System (GNSS), airspeed indicator, altimeter, etc.

In addition, the AAV may also be equipped with one or more meteorological sensors including for example a sun sensor, temperature sensor, barometric pressure sensor, and humidity sensor.

The AAV may also comprise one or more self-monitoring sensors including for example temperature sensors, current sensors, motor tachometer sensors.

The tether and release mechanism may comprise angle encoders and tension sensors for the tether, and inertial measurement unit (IMU), airspeed and ground proximity sensors on the release mechanism.

In one embodiment, a required parameter is an estimate of the angle of the tether. This parameter can be directly measured with an encoder placed on the tether joints or with vision via a camera pointed downwards towards the payload, or tether), or by estimation (e.g., with a Kalman filter or neural network). In addition, in one embodiment, the angle(s) of the tether need to be measured or estimated. This can be done using any suitable sensor(s), vision equipment, or by estimating and/or measuring other parameters of the AAV tether mechanism such as acceleration, attitude, and linear and angular velocity.

The optimizer 36 is the algorithm executed by the onboard flight computer which generates the deployment maneuver 38. In one embodiment, the deployment maneuver is a series of state vectors that describe over time and with a preset time interval the AAV and tether pose, location, and velocity, as well as the required control signals needed to achieve that trajectory. In one embodiment, the resulting trajectory is computed remotely and uploaded to the AAV before or during the flight in real time. Note that the flight computer optimizer 34 may comprise a neural network for determining the trajectory whereby the neural network controls the flight pattern throughout the deployment maneuver.

The scheduler 40 is a program that controls the different phases of the payload delivery procedure. This program initiates the execution of the deployment maneuver and switches to the next phase once it is complete.

As described supra, the autonomous air vehicle (AAV) through a series of velocity changes causes the hanging payload to swing in a pendulum-like manner. In one embodiment, the oscillations could be generated with actuators or a propulsive module located on the tether. The swinging action could also take advantage of and utilize any elasticity in the tether. The generated trajectory is such, that exactly at the desired deployment point, at zero (or almost zero) height, the payload will have a relative speed of zero (or almost zero) both vertically and horizontally with respect to the deployment target (e.g., ground, moving platform, on water, etc.), and at that point the tether is disconnected from the payload, thus gently and smoothly laying the payload down at the target destination. Note that all this occurs without the need of the AAV to cease moving forward.

In one embodiment, the AAV can be controlled using neural networks during the deployment maneuver and/or to estimate the tether angles. These neural networks could be trained with simulations in virtual environments using various well-known techniques such as reinforcement learning.

In another embodiment, the trajectory taken by the AAV could be computed remotely, and updated on the fly using communication networks such as 5G and satellite internet constellations such as OneWeb or SpaceX's Starlink. Note that 5G networks can be used for remotely controlling the AAV in realtime. Computing the trajectory and uploading it to the AAV can be performed using any suitable network. The use of 5G or Starlink is advantageous because of their low latency but any suitable network can be used.

Note that in one embodiment, the trajectory is computed remotely and uploaded to the AAV but the onboard computer controls the AAV. In an alternative embodiment, the AAV is remotely controlled using the communication network.

An example illustrating the phases of the operation of delivering a payload will now be described. A diagram illustrating an example AAV dispatched carrying a payload is shown in FIG. 4A. initially, the AAV 60 is loaded with one or more payloads 62, e.g., packages, and is dispatched carrying the one or more payloads enroute to the target destination 64, also referred to as the drop point, drop zone, deployment location, etc.

A diagram illustrating an example AAV with its tether extended before arriving at the destination is shown in FIG. 4B. Several tens or hundreds of meters before arriving at the destination, the tether 68 is extended. A release mechanism 66 is operative to release the payload 62 in response to a release signal generated by the onboard flight computer or in the tether or release mechanism itself depending on the particular implementation. Note that the payload and tether is at an angle to the normal due to the forward motion of the AAV.

This, however, does not necessarily have to be the case. The tether may be at any angle as long as the relative velocity of the payload (i.e. relative to the dropping point) is zero. For example, if the drone is climbing, the tether may be at some angle or if the target is a vessel on water it could have some vertical speed due to wave action.

In one embodiment, the release mechanism has autonomy provided by its own computer to do fine corrections to the movement of the AAV, especially if it comprises an actuator. Otherwise, the release can be controlled centrally from the flight computer.

A diagram illustrating an example AAV making a series of accelerations and decelerations before arriving at the destination is shown in FIG. 4C. At approximately 50 meters before arriving at the deployment location 64, at a height of approximately 10-15 meters, through a series of abrupt accelerations and decelerations, the payload 62 and tether 68 begins swinging in a pendulum like manner in order to induce oscillations on the tether. In this stage the AAV induces or generates oscillations on the tether using any suitable mechanism such as generating a series of tuned accelerations and decelerations.

A diagram illustrating an example AAV just before and after payload delivery whereby the payload has zero ground speed is shown in FIG. 4D. In this phase, the AAV programs its trajectory such that at the moment the payload touches down at the destination 64, its speed is approximately the opposite that of the payload 62. This means that the payload has a zero or near zero ground speed at the point when it gently touches the destination (e.g., ground, etc.). At that precise moment the payload is released via the release mechanism 66.

Note that the AAV may need to carry the payload extended from the tether for a distance of several tens/hundreds of meters. This requires a feasible path without obstacles in its way. In addition, the area around the deployment location is preferably clear of people because the swinging payload could present a hazard in some situations.

In an alternative embodiment, the tether can be made of a single stage or multiple stages. Each stage of the tether may be soft (e.g., a thread, rope, strong, etc.) or rigid (e.g., a rod, pipe, arm, etc.) or a hybrid mechanism made of a combination of soft and rigid components. The tether could also comprise a mesh of threads that constrain the swinging movement to certain axes or shapes. Further the tether may comprise one or more passive or actuated joints. In this case, the oscillations (i.e. pendulum swings) may be generated either by (1) changes in speed of the AAV, (2) motors on the axes of the tether, or (3) dedicated propulsion at the joints.

In addition, the tether or each of its links may have a constant length or a variable length, i.e. may be foldable, retractable, telescopic or elastic. The oscillations induced in the payload and tether may be planar, elliptic or torsion in nature. Further, sensors such as ground proximity sensors may be added to the end actuator, or tension sensors may be added to the tether material to aid in generating trajectory corrections.

In addition, to a pendulum or a multi joint pendulum, in one embodiment, the deployment mechanism may comprise a robotic arm. In this case, the robotic arm may be installed at the end of the tether or may replace the tether while still maintaining pendulum-like motion.

Note that in one embodiment, the trajectory of the AAV and payload could be generated offline by the optimizer and followed or regenerated in real time or near real time using a model predictive controller (MPC). The deployment maneuver could also be performed using well-known reinforcement learning techniques with or without a neural network.

Figure 5:
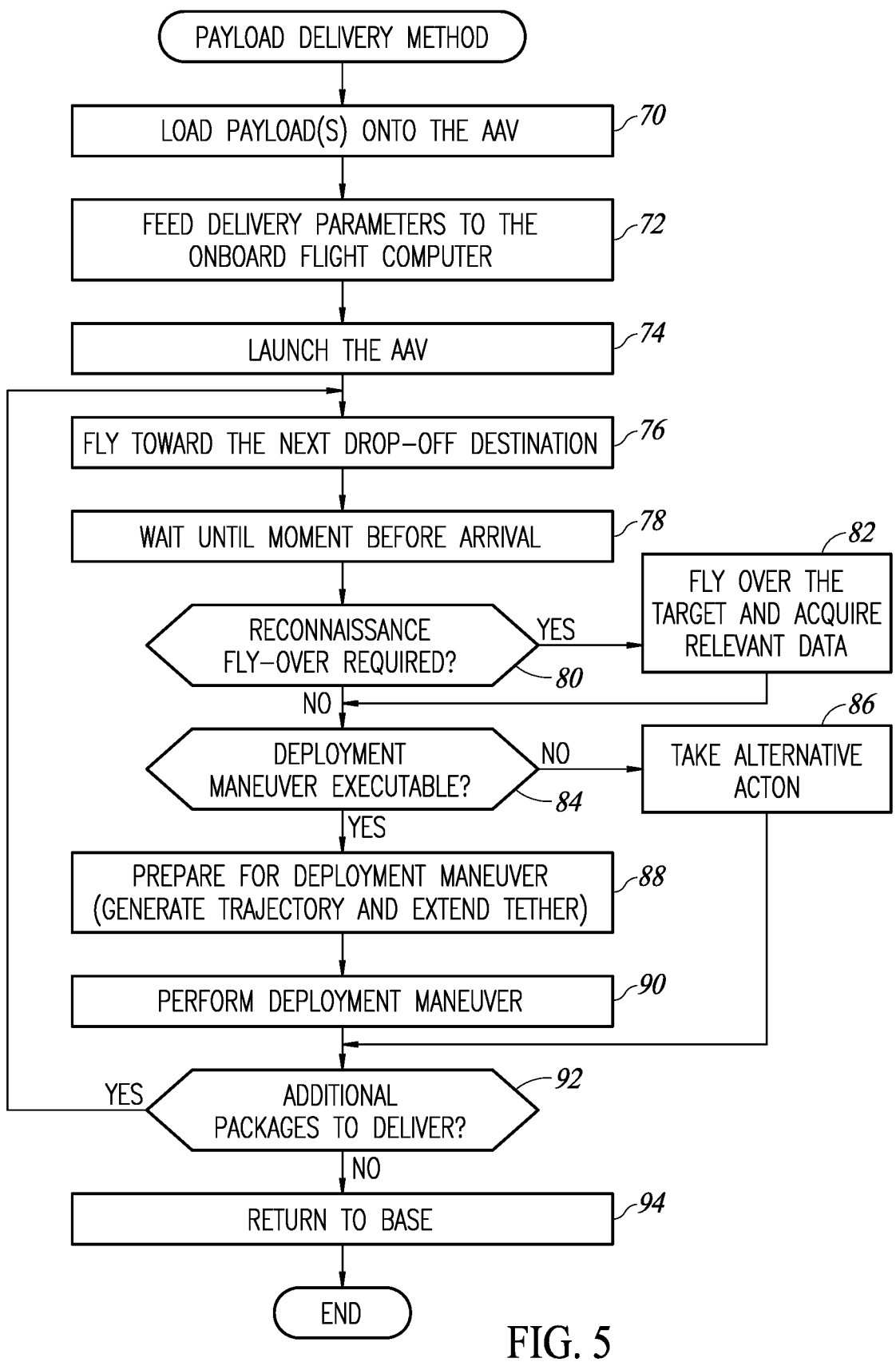
FIG. 5 is a flow diagram illustrating an example AAV based payload delivery method.

A flow diagram illustrating an example AAV based payload delivery method is shown in FIG. 5. Initially, the process begins by loading one or more payloads onto the AAV and connecting them to the release mechanism (step 70). At this point, the tether is in the fully retracted position. Delivery parameters are then fed to the onboard flight computer (step 72). Delivery parameters may include the drop-off point location for each payload, digital terrain model (DTM) or other model of the drop-off locations and surroundings, payload mass and aerodynamic coefficients, meteorological data, long term flight path, etc. Some or all of these parameters could be updated and/or sensed/calculated by the AAV during the flight or remotely uploaded either for the first time or as an update. These parameters may or may not be shared with a centralized flight control entity. Thus, taking into account the delivery parameters, the flight plan is then generated.

Once the flight plan is generated, and after coordinating with the traffic control entity (if any) and obtaining clearance therefrom, the AAV is launched either vertically from a runway or with the aid of a catapult (step 74). Once launched, a notification may be sent to the one or more recipients informing them of the impending delivery.

The AAV then flies towards the first (or next) destination or drop off point (step 76). Note that alterations from the original flight plan may be required due to traffic, meteorological conditions or airspace control requests. These alterations could be generated autonomously or remotely.

At a certain distance (e.g., 10, 100, or 1000 meters) before arriving at the drop off point (step 78), the surrounding area is observed and analyzed by the flight computer utilizing one or more of the onboard sensors. The computer analyzes the sensor data received for obstacles and hazards such as objects that may generate turbulences under the prevailing wind conditions.

It is then determined whether a reconnaissance fly-over is required (step 80). If (1) the visibility along the trajectory is impaired for some reason to the degree that the AAV cannot properly observe the area surrounding the designated drop off point, (2) the flight computer does not have sufficient a priori information about the area around the drop-off point, or (3) it is not possible to generate the deployment maneuver for any reason, then the onboard flight computer may decide to perform a reconnaissance maneuver by flying above the drop off point and its surrounding area (step 82).

This fly-over maneuver is intended to acquire relevant data and visually analyze the surrounding area of the drop off point while looking for obstacles or hazards. The data gathered may be used for future deliveries to the same area. At the completion of this maneuver it is determined whether the deployment maneuver can be carried out or not (step 84).

If for some reason the deployment maneuver cannot be executed, such as high, gusting or turbulent winds, or a clear path cannot be found, other alternative actions may be carried out such as landing, lowering the payload in a crane like mode, or aborting any attempt at deployment for that drop off point (step 86).

If the deployment maneuver can be executed, then the flight computer prepares for it by entering a stage in which the optimizer generates a trajectory based on the environmental characteristics of the area surrounding the drop-off point (i.e. obstacles, wind, terrain, etc.). Once the trajectory is generated, the AAV proceeds to the initiation point of the trajectory while extending the tether (step 88).

In one embodiment, preparations for the deployment maneuver (step 88) include: (1) generating the deployment maneuver trajectory; (2) extending the tether which may be a cable/rope or robotic arm; and (3) flying to the beginning point of the trajectory (can be done simultaneously with step no 2).

Note that the generating the deployment maneuver trajectory step above may fail in the event the trajectory is not feasible under the provided parameters and constraints, and consequently, the optimizer fails to plan a trajectory. Note also that if the tether is some kind of cable, its length could be a parameter that is optimized by the optimizer or other trajectory generator.

Executing the deployment maneuver is a critical part of the flight. The onboard flight computer generates flight control signals such that the AAV performs the generated trajectory (step 90). Note that depending on the configuration, the trajectory may have to be regenerated in real time to compensate for disturbances previously unaccounted for. As described supra, the flight computer may employ one or more neural networks that controls and adjusts the flight pattern of the AAV throughout the deployment maneuver including estimating tether angles. The optimizer ensures that the position of the payload will at some point be exactly or near exactly on the drop-off point at substantially zero velocity. When that moment occurs, the release mechanism on the tether is activated and the payload is gently laid on the ground. After the execution, the AAV proceeds to the next drop off point (step 76) if there are additional payloads to deliver (step 92) or otherwise returns back to its base (step 94) if there are none.

The generation of the deployment maneuver will now be described in more detail. In one embodiment, the generation of the deployment maneuver is approached as a multi-phase constrained optimal control problem (OCP) in which the optimization vector is a constant amount of points in the state space that represents the trajectory. This vector is initialized with the values of a recent trajectory to speed up the optimization process and to reduce the chances of convergence to undesired local minima. This is done in the case of an execution scheme based on the successive regeneration of trajectories as done with MPCs.

The cost function to be minimized reflects the overall maneuver duration and the speed at the release moment. The weights of the different parameters are tweaked, in order to achieve a satisfactory behavior. The constraints include the dynamic model of the AAV and the tether. This is a set of ordinary differential equations (ODEs) that describes the propagation in time of the state. The state vector includes the pose and velocity of the AAV and the pose and velocity of the pendulum formed by the tether and the payload attached to it. The model includes the effects of aerodynamic drag which are not considered negligible given the relative high speeds of the deployment maneuver. The ordinary differential equations vary according to the type of aircraft that act as the AAV. For example, fixed-wing dynamic equations differ from rotary-wings equations.

Another constraint is the "drop constraint," which enforces that when the payload is on the location of the drop off spot, its height, as well as its vertical and horizontal velocities, must be zero relative to the target destination.

The "ground constraint," which enforces that during the whole trajectory, both the AAV and the payload maintain a safe clearance distance from the ground and never below it. This constraint has the exception that the payload is allowed to be closer to the ground when it is close to the drop off point. This constraint also ensures clearance of other obstacles in the proximity of the drop off location.

The "box constraints" function to limit the various components of the state vector and control signals to realistic and safe values such as maximum thrust or tilt angle.

The "start and end conditions" help the optimizer reach the desired solution. An example of such a constraint would be to initiate the trajectory at a location before the drop off point, and finish behind it. This ensures not converging to an undesired local minimum in which, for example, the AAV attempts to fly backwards after releasing the payload.

It is noted that the computed trajectory may not be feasible meaning that the optimizer may fail to converge and generate a trajectory that conforms to all the applied constraints. This may happen for several reasons. Several hypothetical examples of the trajectory failing to converge are provided below.

In a first example, the AAV is a rotary wing aircraft and its thrust is too weak to hold its own weight airborne. In a second example, the payload has a relatively high aerodynamic drag coefficient which makes it lean backwards when hanging from an extended tether, even at the lowest speed the AAV is capable of flying at. This means that the AAV is not capable of flying slow enough to cause the pendulum to swing forward from the neutral point without stalling. This happens very close to the ground so generating a maneuver which requires purposely stalling is not an option. Or the maneuver cannot be performed without the addition of some kind of actuation to the tether as described supra.

In a third example, the tether is placed far away from the center of mass of the AAV and the latter is not able to counteract the torques exerted by the former. In a fourth example, several obstacles obstruct the access to the drop-off point in a way the AAV is not capable of maneuvering around to avoid them and accomplish the payload release smoothly.

Utilizing the method described herein, there are two ways to achieve a successful execution of the deployment maneuver. It is noted that attempting to execute the offline generated trajectory as is, simply by feeding the generated control signals to the different actuators on the AAV is typically insufficient. This is because despite the best efforts to properly model the AAV, there typically are disturbances that are unaccounted for, inaccurately measured parameters, or models based on imprecise approximations.

Therefore, there are in general two ways to achieve the desired execution: (1) generating the trajectory a priori with safety margins included, e.g., assuming the thrusters are weaker that they are in reality, and feeding the desired trajectory as a reference to another controller which operates in a closed loop manner, e.g., proportional integral derivative (PID), model predictive control (MPC), nonlinear feedback control, etc.); and (2) feeding the generated control signals to the different actuators on the AAV, but regenerating the trajectory iteratively whereby at each iteration, the initial conditions are updated according to the state estimation of the flight computer, measured by the various onboard sensors. This second scheme is effectively a nonlinear MPC. To achieve this, the optimizer has the capability of regenerating the trajectory in real time.

It is noted that other options include not generating any maneuvers offline a priori but rather utilizing well-known techniques of reinforcement learning, neural networks or other machine learning based techniques to execute the deployment maneuver.

Note also that the releasing signal is generated by the optimizer. This signal, however, may be overridden by a sensor in the tether or the AAV that signals when the payload has touched the target destination (e.g., the ground) or is close enough to it.

An example is provided to illustrate the execution of an example deployment maneuver. The example shown is the result of a trajectory generated for typical set of parameters for an AAV comprising a multicopter (i.e. a drone).

Figure 6A:
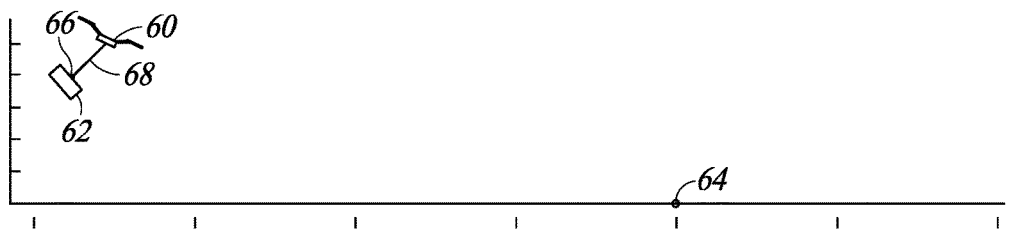
FIG. 6A is a diagram illustrating an example AAV approaching a drop point and extending its tether.

A diagram illustrating an example AAV approaching a drop point and extending its tether is shown in FIG. 6A. At this point, the AAV 60 has its tether 68 extended and is connected to the payload 62 via the release mechanism 66. The AAV is approaching the target destination drop point 64. At approximately 60 meters, the tether is extended and the payload is hanging from the tether. Note that the payload is pulled backwards due to the aerodynamic drag from the forward motion of the AAV.

Figure 6B:
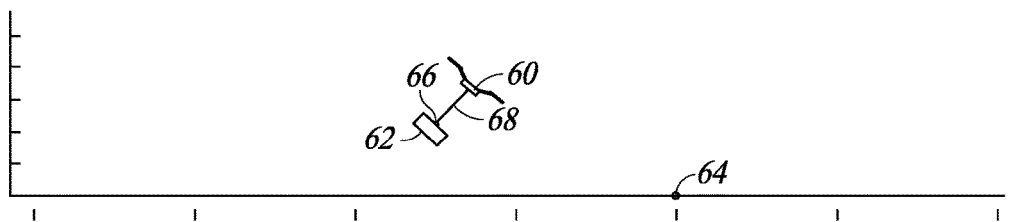
FIG. 6B is a diagram illustrating an example AAV beginning its final descent towards the drop off point and initiates swinging motion.

A diagram illustrating an example AAV beginning its final descent towards the drop off point and initiates swinging motion is shown in FIG. 6B. Here the AAV 60 begins its descent towards the drop-off point and begins swinging the payload 62 at the end of the tether 68 in a pendulum like manner by accelerating and/or decelerating.

Figure 6C:
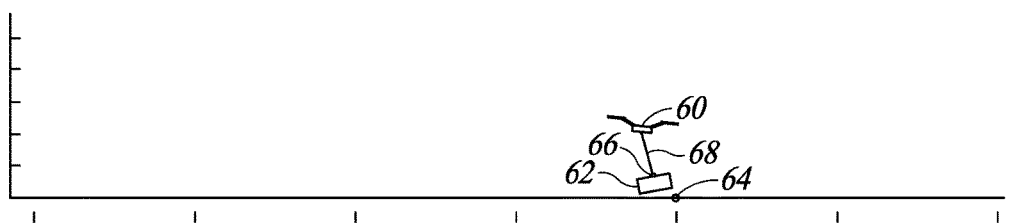
FIG. 6C is a diagram illustrating an example AAV right before touchdown of the payload where the payload decelerates until its ground speed is close to or at zero.

A diagram illustrating an example AAV right before touchdown of the payload where the payload decelerates until its ground speed is close to or at zero is shown in FIG. 6C. During the last few moments right before touch down, the AAV maneuvers such that the payload decelerates until its ground speed is close to zero. The deceleration causes the payload (i.e. the pendulum) to swing forward. It is important to note that only the payload and not the AAV that has zero speed, i.e. zero velocity relative to the dropping point which is not necessarily the ground and is not necessarily stationary.

Figure 6D:
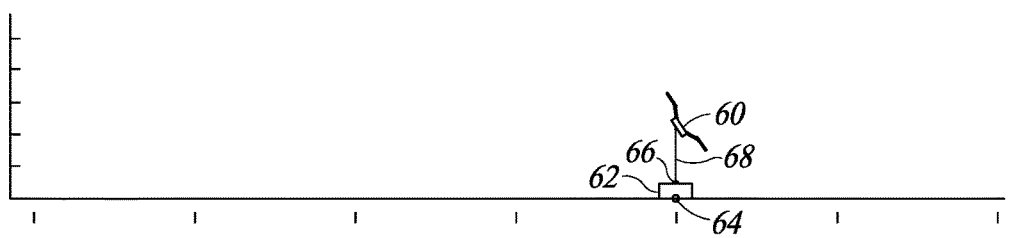
FIG. 6D is a diagram illustrating an example AAV at point of touchdown of the payload.

A diagram illustrating an example AAV at point of touchdown of the payload is shown in FIG. 6D. At this point, the payload touches down at the designated drop-off point at zero or near zero ground speed.

Figure 6E:
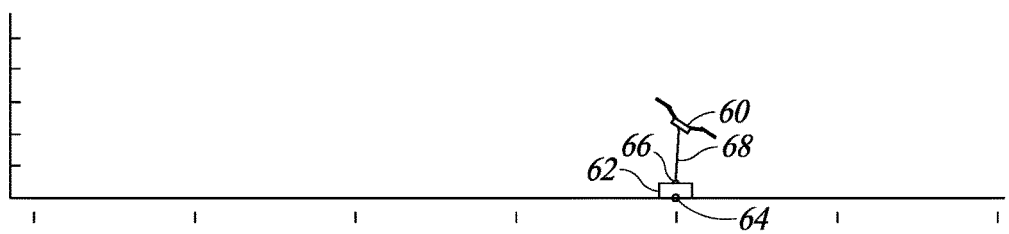
FIG. 6E is a diagram illustrating an example AAV releasing the payload.

A diagram illustrating an example AAV 60 releasing the payload is shown in FIG. 6E. At the moment the payload touches down at the target location, the payload 62 is released from the tether 68 by sending an appropriate signal to the release mechanism 66.

Figure 6F:
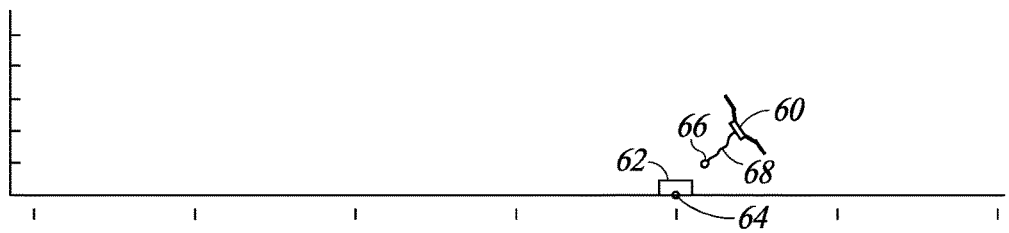
FIG. 6F is a diagram illustrating an example AAV continuing its flight after releasing the payload.

A diagram illustrating an example AAV continuing its flight after releasing the payload is shown in FIG. 6F. Once the payload is released, the AAV continues its flight by gaining altitude to remain clear of obstacles while the payload remains at the designated drop-off location. The AAV continues to the drop-off location of other payloads it may be carrying.

Note that in practice, the trajectory typically needs to be regenerated in real time to adjust for deviations that accumulate during the execution, i.e. model predictive control (MPC), or if possible, enforced as originally generated. As described supra, a reinforcement learning approach could also be implemented to accomplish the deployment maneuver as well.

The inventor has constructed and run simulations of the deployment maneuver in which the AAV is modeled as multicopter and the tether is a passive single link pendulum. The simulation runs an offline generated trajectory. The inventor performed simulations which included successfully executing maneuvers with similar principles. The problem was solved in two-dimensions (2D) in order to save computational resources. It is appreciated, however, that a fully three-dimensional (3D) approach could be implemented by one skilled in the art. The dynamic model including a pendulum is described below. Note that it is not critical whether the tether is rigid or not because the tension on it remains positive throughout the whole maneuver.

The dynamic model is described by the following equations presented below. The translational motion of a multicopter in inertial reference frame $\mathbb{I}$ is described by $$\dot{v} = \frac{1}{m}(R_{\mathbb{I}}^{\mathbb{B}} f_{th} e_3 - f_D(v)) - g e_3 \quad (1)$$

where $R_{\mathbb{I}}^{\mathbb{B}} \in SO(3)$ transforms the force exerted by the AAV motors $f_{th}$ from body frame $\mathbb{B}$ to $\mathbb{I}$. Parameter g is the gravity acceleration, e is the standard basis, m is the total system mass, and $f_D(v)$ is the aerodynamic drag force, which is given by $$f_D(v) = \rho C_D A \|v_{AS}\|^2 \hat{v}_{AS} \quad (2)$$

In Equation 2, $C_D$ is the aerodynamic drag coefficient and A is the cross-section area of the AAV, both of which are assumed to be constant scalars. Constant $\rho$ is the air density, $v_{AS}$ is the air speed, which is defined by $v - v_{wind}$ (i.e. the difference between the AAV and the wind velocities), and $\hat{v}_{AS}$ is a unit vector pointing in the direction of $v_{AS}$.

The translational dynamics of the AAV model are described in Equations 1 and 2. The system relies on a nonlinear controller which controls the multicopter rotors in such a way that the pitch angle behaves as a first-order linear system. Namely, its dynamic model is given by $$\dot{\theta} = K_\theta(\theta_{ref} - \theta) \quad (3)$$

where $\theta$ is the actual pitch angle of the multicopter, $K_\theta$ is the (empirically determined) pitch angle transient factor, and $\theta_{ref}$ is the reference pitch angle of the multicopter, which is a control input signal. This layered architecture permits the simplification of the model and avoids the need to model more complex features, such as the electric motors or the aerodynamic behavior of the propellers, thus lowering the computational requirements.

In one implementation, the mechanism of the present invention relies on an architecture in which there is an underlying nonlinear state controller which controls the AAV's thrusters in such a way that the tilt angle can be considered to behave as a first order system. This architecture is not mandatory and the motor's model might be added to the dynamic model of the whole system. The OCP might also be solved for this as well.

In order to add the effects of the pendulum to the dynamic model, the aerodynamic drag of the payload $f_{D\_payload}$, as well as the centrifugal force exerted by its swinging motion are added to Equation 1. The aerodynamic drag is identical to that described in Equation 2 (and indeed is summed to it), except, that in this case $V_{AS}$ is the payload airspeed which is given by $$v_{AS\_payload} = v_{AS\_AAV} + \omega L \quad (4)$$

where $v_{AS\_payload}$ is the payload airspeed, $v_{AS\_AAV}$ is the vehicle or AAV airspeed, $\omega$ is the angular velocity of the tether (i.e. the pendulum) and L is its length. The centrifugal force component is given by $\omega^2 L m_{payload}$. The angular velocity of the pendulum $\omega$ is described by an ordinary differential equation that contains the sum of all the torques that act on the pendulum: (1) the torques cause by tangential components of earth's gravity, (2) the AAV's thrust, and (3) the aerodynamic drag. Thus $$\dot{\omega} = \frac{g \sin\beta}{L} + \frac{f_{th}\sin(\beta+\theta)}{L m_{AAV}} + \frac{f_{D\_pyld}}{L m_{pyld}} \quad (5)$$

For the example provided herein the following parameters were used: the trajectory is made of 100 intervals; the AAV weighs 5.5 kg and has a moment of inertia of 0.384 kgm² around the pitch axis; the AAV has sufficient thrust to lift 19.5 kg but the trajectory was generated assuming it can produce only 80% thereof; the payload weighs 5 kg and it has an aerodynamic drag coefficient of a cube with dimensions 30 cm×30 cm×30 cm; and the tether is 3 m long and it hangs from the center of mass of the AAV without it exert any torque on it.

In addition, the trajectory had the following box constraints: the AAV tilt angle θ was limited to 90° (it cannot point the thrust downwards); the tether angle θ was limited to a swing range of ±45°; the trajectory was forced to begin at least 40 m before the drop off point and at most 140 m before it; the trajectory was also forced to finish at least 5 m past it; the maximum altitude was limited to 200 m above the drop-off point through the trajectory but it was forced to begin at a maximum of 10 m height and finish at a height of at least 4 m.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of delivering a payload for use in an autonomous air vehicle (AAV), the method comprising:
   flying said AAV loaded with at least one payload held by a tether towards a target destination;
   initiating performance of a deployment maneuver at some point before said AAV arrives at said target destination, said deployment maneuver includes maneuvering the AAV to induce swinging the at least one payload and the tether in a controlled and coordinated manner with the trajectory of the AAV;
   as a result of said deployment maneuver touching down said payload at or near said target destination without the AAV needing to cease moving forward at any time; and
   releasing said payload held by the tether at a point in its trajectory where relative velocity of said payload with respect to said target destination is at or near zero as a result of said deployment maneuver while the AAV maintains its trajectory.

2. The method according to claim 1, further comprising proceeding to a next target destination drop off location when additional payloads are to be delivered.

3. The method according to claim 1, wherein said trajectory is computed a priori with safety margins and functions as a reference in a closed feedback control loop.

4. The method according to claim 1, wherein said trajectory is computed iteratively in real time or near real time whereby initial conditions are updated in accordance with measurements from one or more on board sensors.

5. The method according to claim 1, wherein said deployment maneuver is executed utilizing a technique selected from a group consisting of: a model predictive controller (MPC), one or more neural networks, remotely, machine learning, and reinforcement learning.

6. The method according to claim 1, wherein said payload is released from said tether via a signal from an onboard flight computer.

7. The method according to claim 1, wherein said payload is released from said tether in accordance with a tether state determined from data received from one or more sensors and selected from the group consisting of AAV speed, AAV acceleration, AAV angular velocity, AAV attitude, vision system, indication of said payload touching down or about to touch down at or near the target destination.

8. An apparatus for delivering a payload for use in an autonomous air vehicle (AAV), comprising:
    an onboard flight computer operative to receive data from a plurality of onboard sensors and control flying of said AAV loaded with at least one payload held by a tether towards a target destination;
    an optimizer operative to generate said deployment maneuver whereby said deployment maneuver includes maneuvering the AAV to induce swinging the at least one payload and the tether in a controlled and coordinated manner with the trajectory of the AAV and the at least one payload touches down at or near said target destination and is released at a point in its trajectory where relative velocity of said at least one payload is at or near zero with respect to said target destination without the AAV needing to cease moving forward at any time; and
    a scheduler operative to control said deployment maneuver procedure including initiating execution thereof at some point before said AAV arrives at said target destination.

9. The apparatus according to claim 8, wherein said trajectory is computed a priori with safety margins and functions as a reference in a closed feedback control loop executed in said flight computer.

10. The apparatus according to claim 8, wherein said trajectory is computed either onboard or remotely and uploaded to the AAV utilizing a neural network or trajectory optimizer.

11. The apparatus according to claim 8, wherein onboard flight computer is operative to compute said trajectory iteratively in real time or near real time whereby initial conditions are updated in accordance with measurements from said plurality of on board sensors.

12. The apparatus according to claim 8, wherein said onboard flight computer is operative to execute said deployment maneuver utilizing a technique selected from a group consisting of a model predictive controller (MPC), one or more neural networks, machine learning, and reinforcement learning.

13. The apparatus according to claim 8, wherein said onboard flight computer is operative to release said at least one payload from a tether via a signal from said flight computer.

14. The apparatus according to claim 8, wherein said payload is released from a tether in accordance with a tether state determined from data received from one or more sensors and selected from the group consisting of AAV speed, AAV acceleration, AAV angular velocity, AAV attitude, vision system, indication of said payload touching down or about to touch down at or near the target destination.

15. The apparatus according to claim 8, wherein said tether is selected from the group consisting of a fixed length tether, adjustable length tether, multiple link tether, flexible tether, elastic tether, foldable tether, retractable tether, passive tether, active tether and telescopic tether.

16. A method of delivering a payload for use in an autonomous air vehicle (AAV), the method comprising:
    flying said AAV loaded with at least one payload towards a target destination;
    initiating performance of a deployment maneuver at some point before said AAV arrives at said target destination whereby the AAV maneuvers to induce swinging of the at least one payload and the tether in a controlled and coordinated pendulum-like manner with the trajectory of the AAV while the AAV maintains its trajectory;
    maneuvering said AAV such that a trajectory of said at least one payload has a relative speed of zero or near zero velocity with respect to said target destination and a height above said target destination of zero or near zero at which point said at least one payload held by the tether is released; and
    wherein said AAV is not required to cease moving forward at any time during performance of said deployment maneuver.

17. The method according to claim 16, wherein said deployment maneuver utilizes a series of velocity changes and/or active propulsion to generate said pendulum-like swings in said payload.

18. The method according to claim 16, further comprising performing trajectory corrections on the fly in accordance with measurements from one or more onboard sensors.

19. The method according to claim 16, wherein said payload is released from said tether via a signal from an onboard flight computer.

20. The method according to claim 16, wherein said payload is released from said tether in accordance with a tether state determined from data received from one or more sensors and selected from the group consisting of AAV speed, AAV acceleration, AAV angular velocity, AAV attitude, vision system, indication of said payload touching down or about to touch down at or near the target destination.

* * * * *